Dec. 25, 1962  I. SIMON  3,069,964
METHOD FOR OPTICAL MEASUREMENT OF FIBER DIAMETERS
Filed Dec. 30, 1957
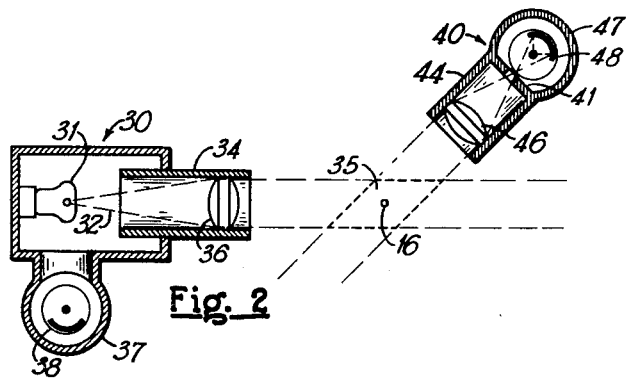
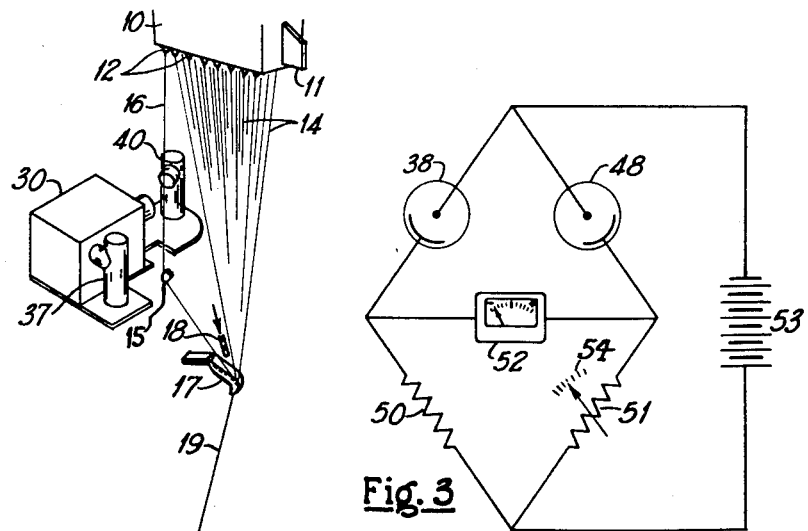
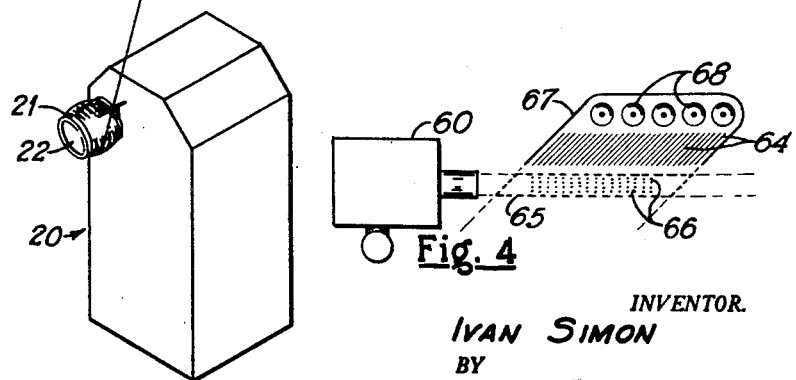
INVENTOR.
IVAN SIMON
BY
Staelin & Overman
ATTORNEYS

United States Patent Office 3,069,964
Patented Dec. 25, 1962

3,069,964
METHOD FOR OPTICAL MEASUREMENT OF FIBER DIAMETERS
Ivan Simon, Belmont, Mass., assignor, by mesne assignments, to Owens-Corning Fiberglas Corporation, Toledo, Ohio, a corporation of Delaware
Filed Dec. 30, 1957, Ser. No. 705,855
3 Claims. (Cl. 88—14)

This invention relates to the dimensional measurement of fibers or continuous filaments of transparent material, and more particularly to a method for measurement of the diameter of fibers of glass or like material.

In the production of fibers such as continuous glass fibers it has become increasingly important to maintain diameters of exacting dimensions throughout their length, and in order to do so, it has become a necessity that the dimensions be measurable while the fibers are in motion, such as in fiber-forming operations so that adjustments can be made to produce the dimensions desired with a minimum of waste in out-of-specification products. The weakness to abrasion of glass fibers, however, presents a difficulty in their measurement in that any action to hold the fibers in a given position generally requires that the fibers be restrained or held in some fashion while the measurement is taking place. This requirement does not lend itself to measurement of fiber diameters during forming operations where the fibers are moving at extremely rapid rates which would cause abrasion damage due to restraints effected during measurement. Another difficulty presented in the measurement of glass fiber diameters is the fact that the diameters are extremely small, being in the order of much less than the diameter of a human hair. In many instances the fiber diameters to be measured are in the order of but a few microns, and with further advancements in production methods, it is anticipated that measurements will be required to extend to fiber diameters in the fractions of a micron.

Accordingly, conventional methods of measuring filament diameters do not readily lend themselves to measurement of glass fibers. Still further, the methods of measuring diameters of glass fibers are preferably of a type that can be accomplished while the fibers are moving at their fiber-forming speeds, which are steadily increasing year after year as the glass fiber-forming art becomes more fully developed. Speeds of formation of continuous filaments in tests have been carried as high as 30 to 40 thousand feet per minute or more, and on a production basis, in the range of from 10 to 15 thousand feet per minute. Thus, any method of measuring the diameters in forming must be of a type which will be extremely rapid, accurate, and nonrestraining during measurement.

In addition to the above, it is another object of this invention to provide a method for measurement of continuous filaments of transparent material which offers no physical restraint during the measuring operation and which provides a continuous reading as the fiber is moved lineally, such as in the fiber-forming operation.

It is still another object of the invention to provide a method of measuring filaments of transparent material which will lend itself to automatic control and corrective adjustment to bring the diameter values to within desired tolerances.

It is still another object of the present invention to provide a method for measuring the diameter of continuous fibers of transparent material such as glass which is adaptable to both measurement of individual fibers, as well as to the simultaneous measurement of a plurality of fibers.

In brief, the above objectives are attainable according to the present invention by utilization of the refractive characteristic of transparent material upon directing a light beam thereagainst. A cylindrical fiber will refract light falling upon it over a wide angle on all sides of the axis of the incident beam in a plane cutting normally through the fiber; the width of the angle depending upon the index of refraction of the fiber. The total quantity of light refracted from a fiber, such for example as a glass fiber, as well as the intensity of the light refracted from the fiber, is directly related to its diameter. A measurement of the intensity or quantity of light refracted by a fiber being measured will therefore serve as a measurement of the fiber diameter.

To utilize these principles according to the present invention, the intensity of refracted light at a given point within the quantity refracted by the fiber being measured is utilized as a measure of the diameter of the fiber. Accordingly, a beam source of light is directed against the fiber as it is moved lineally and a light sensitive element is placed in the zone of the light refracted outside of the beam, and the light intensity indicated by the light sensitive element is utilized as indication of the diameter of the fiber causing the refraction.

Features of the invention include the fact that the filament or fiber diameters can be measured without requirement that the fiber be held as measurements are being made.

Another feature of the invention lies in the fact that the method of measurement lends itself to incorporation of the measuring apparatus into an automatic control means for correcting the diameter of fibers as they are being produced to desired values.

Another and still further feature of the invention lies in the fact that it is not based upon shadowing principles as are many optical measuring gauges and accordingly is greater in magnitude and more positive in measurement relative to background light, since the measured light is located outside of the beam of light incident upon the fibers measured. In another sense, the measurements made according to the principles herein taught can be classified as more positive rather than subtractive as with many optical measuring methods and means.

Still another feature of the invention lies in the fact that the method of the invention lends itself to measurement of a plurality of the fibers simultaneously.

These and other objects and features of the invention will become more apparent from the following description taken in conjunction with the accompanying drawing in which:

FIGURE 1 is an elevational view in perspective of an assembly for forming continuous fibers of glass in which a newly formed strand is collected into a package on cylindrical winding apparatus, and in which one of the filaments or fibers attenuated from the feeder is measured in diameter as representative of the diameters of filaments drawn from the feeder.

FIGURE 2 is a somewhat schematic plan view of the principal measuring components associated with the device for measuring fiber diameters illustrated in FIGURE 1.

FIGURE 3 is a schematic diagram of a balancing circuit for compensating light variations in the transmitter for the measuring apparatus.

FIGURE 4 is a somewhat schematic plan view of an arrangement of measuring apparatus for determining and regulating the diameter of a plurality of transparent fibers.

Although the present invention is described in relation to the formation of strands of continuous glass fibers, it will be understood that although described in such relationship, the novel aspects of the invention have broader application to measurement of fibers of different transparent materials other than glass, just so long as the fibers being measured are generally circular in cross-section and the light refracted is of sufficient magnitude with the beam directed against the fiber that measurement thereof can be made with available light sensing elements.

Turning to the drawings in greater detail, FIGURE 1 shows a glass fiber-forming operation in which a resistance type melter 10 contains molten glass melted and retained at a temperature for the formation of fibers by passage of electrical current through the melter by way of its terminals 11 disposed at opposite ends of the melter. Orificed tip 12 are provided in the bottom of the melting unit 10 which allow flow of molten streams of glass for attenuation of continuous fibers 14 therefrom. The fibers are attenuated and drawn over a gathering member 17 to form a strand 19 and then are wound into a package 21 on a collet 22 of a winder 20. Sizing fluid is supplied to the fibers 14 at the gathering member 17 by introducing the fluid from a tube 18 connected to a sizing fluid source not shown.

One of the fibers, a single fiber 16, is drawn in separate relation from the plurality of fibers 14 over a guide or separating member 15 of material compatible with glass, such as graphite, prior to being passed over the gathering member 17 to form the strand 19. The fiber 16 is drawn over the separate path from the rest of the fibers to pass it through an optical fiber-sensing zone 35 (see FIGURE 2) of the fiber diameter measuring unit.

The fiber measuring unit includes a light transmitter 30 and a light receiving translator 40 located on generally opposite sides of the fiber 16 being measured, but with a somewhat less than 180° disposition from each othe relative to the fiber. A light monitoring component 37 is associated with the light transmitter 30 to compensate for possible variations in light intensity of the source in the transmitter 30, thereby assuring accurate readings of diameter of the fiber 16 regardless of the occurrence of such variations in light intensity.

The light beam formed by the transmitter 30 is collimated and projected directly in front of the transmitter into a fiber-sensing zone 35 through which the fiber 16 is passed. The light receiving translator 40 is located in a position angular to the line of the beam such that it will receive a maximum of refracted light from the fiber 16 upon passage of the fiber through the zone 35. The viewing range of the receiving translator 40 is such that a line projection therefrom crosses the light beam from the transmitter 30 to establish a sensing zone having a cross-sectional shape in plan view corresponding generally to a parallelogram. A sensing zone of this general shape allows accurate fiber measurement without the requirement that the fiber path be exactingly fixed. In other words, accurate measurement of the fiber 16 can be accomplished is a number of paths extending generally over a lateral range of movement and without the path being required to be steady.

The transmitter 30 contains a bulb 31, preferably of the commercially available type designed to approximate a point light source. The light 32 given off by the bulb 31 is gathered in a tube 34 by a lens system 36 and is projected forwardly as a beam.

The light receiving unit 40 contains a measuring phototube 48 in a housing 47 located at the source end of a beam shaping tube 44 which contains a focusing lens system 46 to direct the refracted light bent from the sensing zone 35 by the transparent fiber 16. A mask 41 having a slit is interposed between the focusing lens system 46 and the measuring phototube 48 to minimize the effects of stray light which may pass through the lens system.

The monitoring component 37 contains a phototube 38 similar to that in the light receiver 40 and is located adjacent the light bulb 31 in a position where it receives light signals as long as the bulb 31 is energized. Any variations in intensity of the bulb 31 are sensed by the phototube 38 simultaneously with the same variations being registered in the refracted light received by the phototube 48. By balancing the variations in electrical signals picked up by both of these photocells, variations in light intensity are cancelled out so that the readings of refracted light picked up by the phototube 48 is accurately representative of the size of fiber 16 passing through the sensing zone 35 regardless of light variations which might occur at the source 31.

FIGURE 3 illustrates the simple Wheatstone bridge-type circuit which will effect cancellation of variations in light intensity from the transmitter 30 and also provide a means for calibrating the system for exact measurement of the diameter of fibers. The phototube 38 and 48 form the upper leg elements of the balancing circuit while a fixed resistance 50 and a calibrated variable resistance 51 form the lower legs of the balancing circuit. A suitable current registering meter, such as a galvanometer or a micro ammeter 52, graduated to indicate hundred thousandths of an inch in fiber diameter, is connected between two junctions formed by interconnection of the phototube legs and the resistance legs of the circuit. A source of potential 53 is connected between the junction of the phototube legs and the junction between the two resistance legs of the circuit.

The calibrated variable resistance 51 has a scale 54 calibrated in steps of fiber diameter separated by amounts slightly less than the largest magnitude readable on the scale of the meter 52. The meter 52 is a null reading meter having a central zero reference with graduations extending on both sides to represent plus and minus deviations in the fiber diameter being measured from the diameter in the center of the diameter range selected by moving the arm of the variable resistance 51 across its calibrated scale 54. Thus, the reading registered on the meter 52 corresponds to deviations of the fiber diameter from that represented by the zero reference graduation on the meter 52, which in turn corresponds to the reading indicated by the position of the arm of the resistance 51 on the scale 54. To accomplish such operation of the circuit, the range of ratios of the resistance 51 to the resistance 50 is made to correspond to the range of ratios of impedance or resistance offered by the phototube 48 in the range of fiber diameters to be measured, to the relatively fixed impedance or resistance offered by the phototube 38 in its position adjacent the light source 31 where it receives a relatively constant supply of light flux.

Although the reading arrangement thus described is a null reading arrangement based upon deviation of actual fibers from values determined by movement of the adjustment arm of resistance 51, a suppressed zero scale arrangement can also be readily resorted to whereby a full range of diameters above a predetermined value is shown on the meter 52, and by which the readings can be made directly.

The light refracted by a transparent fiber disposed in a beam of light takes on an appreciable angle of distribution which bends out of the beam projected into the path of the fiber, dependent upon the refractive properties of the material of the fiber, while the intensity of the light at a given point in the beam of refracted light varies with the distance of such point from the fiber. The characteristic of refracted light utilized in the present instance, however, is that of direct variation of intensity of the light received by the receiver 40 with variations in diameter of the fiber.

In actual constructions, 45° displacement of the re- receiver 40 from the light beam has been found successful in indicating the diameter of glass fibers. By way of further example of details of the fiber gauging unit, the light source in the transmitter 30 may be a mercury lamp, such as a General Electric type, H100–A4, which has a high degree of brightness.

Although but a single fiber in a group is shown selected for measurement in the arrangement illustrated in FIGURE 1, it has been found that diameter variations of a single fiber is accurately representative of dimensional variations occurring in the entire group of fibers. Under normal conditions, the probable instantaneous deviation in dimension of any one fiber in the total number from the single fiber measured has been found small once conditions have been established where the melting unit and its associated feeder supply uniform diameter fibers throughout the group. The diameter of a single fiber can be measured by this arrangement at extremely high speeds of movement of the fiber through the measuring unit. Measurements have been made of the fibers in forming operations moving at velocities of 15,000 feet per minute and more.

Regardless of the fact that the arrangement illustrated in FIGURES 1 to 3 was designed specifically for measurement of fibers while in movement, it will be readily recognized that the system is also useable in measuring the diameter of fibers held in fixed positions within the fiber-sensing zone.

FIGURE 4 illustrates an arrangement whereby a plurality of fibers can be measured as a group in which the fibers are to be held to a definite diameter. Light is transmitted by a unit 60 which projects a light beam 65 into a zone in which a plurality of filaments 66 all pass simultaneously in an arrangement of rows and columns. Such an arrangement is designed to accommodate filament measurements in conventional strand forming operations wherein from 204 or 408 filaments may be incorporated in the strand. The beam envelops a zone through which all of the fibers 66 pass, while an angularly disposed receiving unit 67 containing a plurality of phototube receiving elements 68 are disposed to receive the total light refracted by the plurality of fibers 66. Collimating vanes 64 are interposed between the fibers 66 and the receiving phototube elements 68 to minimize the effects of stray light and cross interference from light refracted in the respective portions of the groups of fibers 66. The total amount of refracted light for a group of fibers wherein each fiber is of definite diameter can be determined by trial measurement, whereafter deviations in diameter of individual fibers would act to modify the total refracted light picked up by the phototube elements 68. Thus, when one or more of the fibers are off specification, the total refracted light registered by the unit 67 is effective in revealing such deviation. Accordingly, statistical tolerances can be established to determine the diameter of the average fiber in the total group, taking into consideration the possibility of cancelling errors in the diameters. Alternately, the diameter average of the total group of fibers can be determined.

The measurement of refracted light may be improved considerably by providing a light source operable on 400 cycles in order to establish a light frequency above the generally used 60 cycle or direct current light sources. Arrangements may also be made to use partial shutters to permit comparison of individual fibers within a given fan of filaments and thereby to statistically establish a closer diameter of each of the fibers in the total number illustrated in FIGURE 4 than might be obtainable by non-grouping of the fibers in the total number.

An optical fiber measuring gauge of this type, it has been found, is readily adaptable to regulating the diameters of fibers produced such as by utilizing the fiber diameter signals to modify the temperature of the feeder to bring the fiber diameters to a fixed pre-selected value, or alternately, the signal might be used to modify or regulate the speed of attenuation of the fibers for a definite pre-selected diameter.

In view of the foregoing, it will be understood that while I have shown certain particular forms of my invention, I do not wish to be limited thereto, since many modifications may be made within the concept of the invention and I, therefore, contemplate by the appended claims to cover all modifications which fall within the true spirit and scope of my invention as defined in the claims.

I claim:

1. A method for measuring the diameter of a fiber capable of refracting light comprising disposing the fiber in a beam of light, and measuring the intensity of light refracted by said fiber in a position outside of the beam as indication of the diameter of said fiber.

2. A method for measuring the diameter of a continuous glass fiber comprising continuously moving the fiber axially through a beam of light, and continuously measuring the intensity of light refracted by said fiber in a position outside of the beam to indicate the diameter of successive adjacent portions of said fiber.

3. A method for measuring and controlling the diameter of continuous glass fibers in fiber-forming operations comprising continuously moving a glass fiber through a beam of light, continuously measuring the intensity of light refracted by said fiber in a position outside of the beam to indicate the diameter of successive adjacent portions of said fiber, and providing signals corresponding to said measured values for control of a diameter function in the fiber-forming operation for production of substantially uniform diameter fibers.

References Cited in the file of this patent

UNITED STATES PATENTS

| | | |
|---|---|---|
| 2,214,332 | Kline | Sept. 10, 1940 |
| 2,407,456 | Simison et al. | Sept. 10, 1946 |
| 2,413,486 | Denyssen | Dec. 31, 1946 |
| 2,419,914 | Pamphilon | Apr. 29, 1947 |
| 2,436,262 | Miller | Feb. 17, 1948 |
| 2,531,529 | Price | Nov. 28, 1950 |
| 2,824,486 | Lawrance et al. | Feb. 25, 1958 |
| 2,824,487 | Roehrig | Feb. 25, 1958 |
| 2,869,416 | Nieman et al. | Jan. 20, 1959 |